United States Patent
Rowan et al.

(10) Patent No.: US 6,407,843 B1
(45) Date of Patent: Jun. 18, 2002

(54) SYSTEM AND METHOD FOR SPECTRALLY EFFICIENT TRANSMISSION OF DIGITAL DATA OVER OPTICAL FIBER

(75) Inventors: Michael W. Rowan, Los Gatos; Peter Chang, San Jose; James F. Coward, San Francisco, all of CA (US); Roger R. Taur, Honolulu, HI (US); Stuart Wilson, Menlo Park; Ting K. Yee, Foster City, both of CA (US)

(73) Assignee: Kestrel Solutions, Inc., Mountain View, CA (US)

( * ) Notice: Subject to any disclaimer, the term of this patent is extended or adjusted under 35 U.S.C. 154(b) by 0 days.

(21) Appl. No.: 09/728,376

(22) Filed: Nov. 28, 2000

Related U.S. Application Data

(62) Division of application No. 09/035,630, filed on Mar. 5, 1998.

(51) Int. Cl.[7] .............................................. H04B 10/00
(52) U.S. Cl. ...................................................... 359/189
(58) Field of Search ................................ 359/124, 189, 359/181, 184, 128; 370/210

(56) References Cited

U.S. PATENT DOCUMENTS

| | | | |
|---|---|---|---|
| 4,061,577 A | 12/1977 | Bell ........................... 250/199 |
| 4,701,904 A | 10/1987 | Darcie ........................... 370/3 |
| 4,953,156 A | 8/1990 | Olshansky et al. ............. 370/3 |
| 5,351,148 A | * 9/1994 | Maeda ........................ 359/124 |
| 5,387,927 A | 2/1995 | Look et al. ..................... 348/6 |
| 5,430,568 A | 7/1995 | Little et al. ................. 359/124 |
| 5,559,561 A | 9/1996 | Wei ............................. 348/470 |
| 5,576,874 A | 11/1996 | Czerwiec et al. ........... 359/123 |
| 5,596,436 A | 1/1997 | Sargis et al. ................. 359/132 |
| 5,680,238 A | 10/1997 | Masuda ....................... 359/132 |
| 5,930,231 A | 7/1999 | Miller et al. ................. 370/210 |
| 6,078,412 A | * 6/2000 | Fuse ........................... 359/124 |
| 6,234,427 B1 | * 6/2001 | Stockton ..................... 375/308 |

FOREIGN PATENT DOCUMENTS

| EP | 0 717 521 A | 6/1996 |
|---|---|---|
| EP | 0 756 393 A1 | 1/1997 |

OTHER PUBLICATIONS

Hill, Paul M., et al., "Multigigabit Subcarrier Multiplexed Coherent Lightwave System," *Journal of Lightwave Technology*, vol. 10, No. 11, Nov. 1992, pp. 1656–1664.

Sargis, Paul D., et al., "10–Gb/s Subcarrier Multiplexed Transmission Over 490 km of Ordinary Single–Mode Fiber Without Dispersion Compensation," *IEEE Photonics Letters*, vol. 9, No. 12 (Dec. 1997), pp. 1658–1660.

(List continued on next page.)

*Primary Examiner*—Jason Chan
*Assistant Examiner*—Agustin Bello
(74) *Attorney, Agent, or Firm*—Fenwick & West LLP

(57) ABSTRACT

A system transmits digital data over an optical fiber at high aggregate data rates and high bandwidth efficiencies. The system includes a modulation stage, a frequency division multiplexer, and an optical modulator. The modulation stage QAM-modulates a plurality of incoming digital data channels. The frequency division multiplexer combines the QAM-modulated signals by frequency division multiplexing them into an RF signal. The optical modulator uses the RF signal to modulate an optical carrier for transmission over an optical fiber.

2 Claims, 13 Drawing Sheets

OTHER PUBLICATIONS

Business Wire, "Harmonic Lightwaves Announces Availability of First MCNS–Compliant QAM Modulator; TRANsend QAM is a Vital Component for Delivering Digital Services", Nov. 18, 1997.

Dai, H., C. Lin, M. Ramachandran, "Hybrid AM/QAM Video Trunking Lightwave Systems With Cascaded EDFAs", Conf. Proc. LEOS, 97 Annual Meeting, IEEE Lasers & Electro Optic Society, 1997, vol. 1, pp. 319–320.

Douverne, E., M. Ottka, K. Ruthemann, K. Siegel, "Ein 64–QAM–Modem für SDH–Richtfunkgeräte mit integriertem Kreuzpolarisationsentkoppler", vol. 40, No. 11, Mar. 1, 1994, pp. 89–100.

Fuse, M., Y. Kudo, K. Maeda, "Development of 128 Optical Distribution System of 150 chs AM/QAM Hybrid Signals", *Electronics and Communications in Japan*, Nov. 1996, vol. 79, Issue 11, Part 1, pp. 65–77.

Green, P., "Fiber Optic Networks", 1993, Prentice–Hall, Inc., Englewood Cliffs, New Jersey, p. 331, line 4—line 7, figures 9–1.

Hiramatsu, A. et al., "Hypermedia Photonic Information Network Based on WDM–SCM Broadcast and Select Switching," Conference Proceedings, Leos '96 9th Annual Meeting, IEEE Lasers and Electro–Optics Society 1996 Annual Meeting (Cat. No. 96CH35895), Boston, MA, Nov. 18–19, 1996, pp. 312–313.

Ho, K., H. Dai, C. Lin, "Hybrid WDM Digital Trunking System for both HFC and FTTC Access Networks", Digest IEEE/LEOS 1996 Summer Topical Meetings (Cat. No. 96th 8164), NY, NY, pp. 37–38.

Kanno, N., K. Ito, "Fiber Optic Subcarrier Multiplexing Transport for Broadband Subscriber Distribution Network", IEEE Intl. Conference on Communications Boston ICC/89 World Prosperity Through Communications, Jun. 11–14, 1989, Boston, MA, vol. 2, pp. 996–1003.

Kavehard, M., E. Savov, "Fiber–Optic Transmission of Microwave 64–QAM Signals", IEEE Journal on Selected Areas in Communication, vol. 8, No. 7, Sep. 1990, pp. 1320–1326.

LeBer, J., M. LeLigne, "Digital Transmission on Electric Subcarriers in Optical Fiber Videocommunication Systems", *Optics Communications*, Oct. 15, 1987, vol. 64, No. 2, pp. 120–126.

Li, J., K. Yano, "Development of AM/QAM Hybrid Optical SCM Transmission System", *Proc Intl Conf. On Communication Technology ICCT '96*, May 5–7, 1996, Beijing, China, vol. 1, pp. 575–577.

Lu, X., G.E. Bodeep, T.E. Darcie, "Broad–Band AM–VSB/ 64 QAM Cable TV System Over Hybrid Fiber/Coax Network," IEEE Photonics Technology Letters, vol. 7, No. 4, Apr. 1995, pp. 330–332.

Nakamura, Y., H. Ohtusuka, S. Aikawa, H. Takanashi, "Advanced Techniques for Super Multi–Carrier Digital Microwave Radio With Trellis–Coded 256 QAM Modulation", NTT Radio Communication Systems Laboratories), pp. 389–394.

Nishikido, J. et al., "Multiwavelength Securely–Authenticated Broadcast Network" 11th International Conference on Integrated Optics and Optical Fibre Communications, 23rd European Confernece on Optical Conference Communications IOOC–ECOC 97(Conf. Publ. No. 448), Sep. 22, 1997, pp. 17–20.

Ohtsuka, H. ,O. Kagami, S. Aikawa, H. Takanashi, "256–QAM Subcarrier Transmission for Broadband Distribution Networks", NTT Radio Communications Systems Laboratories, GlobeCom '91, pp. 1817–1822.

Park, J., A. Elrefaie, K. Lau, "1550–nm Transmission of Digitally Modulated 28–GHz Subcarriers Over 77 km of Nondispersion Shifted Fiber", *IEEE Photonics Technology Letters*, Feb. 1997, vol. 9, Issue 2, pp. 256–258.

Swaminathan, V., N. Froberg, L. Upadhyayula, "The end––to–end bit error performance of 64–quadrature amplitude modulated signals in a hybrid AM–vestigial sideband/QAM fiber–optic video transmisson system", *Proceedings of SPIE–International Society for Optical Engineering*, vol. 2917, pp. 274–282.

Tai, C., Pi–Yang Chiang, W. Way, "Eight–Way, 70–km Transmission of 33–Channel 64–QAM Signals Utilizing a 1.3$\mu$ m External Modulation System and Semiconductor Optical Amplifier", *IEEE Photonics Technology Letters*, vol. 8, No. 9, Sep. 1996, pp. 1244–1248.

Tang, D., "Multi–Gigabit Fiber–Optic Video Distribution Network Using BPSK Microwave Subcarriers", IEEE 1989 MTT–S Intl. Microwave Symp Digest, Jun. 13–15, 1989, Long Beach, CA, vol. 2, pp. 697–701.

Wilson, G, "Capacity of QAM SCM systems utilising optically linearised Mach–Zehnder modulator as transmitter", Electronic Letters, vol. 34, No. 25, Dec. 10, 1998, pp. 2372–2374.

* cited by examiner

SYSTEM AND METHOD FOR SPECTRALLY EFFICIENT TRANSMISSION OF DIGITAL DATA OVER OPTICAL FIBER

RELATED APPLICATIONS

This application is a divisional of pending U.S. patent application Ser. No. 09/035,630, "System and Method for Spectrally Efficient Transmission of Digital Data over Optical Fiber", by Michael W. Rowan et al., filed Mar. 5, 1998, which subject matter is incorporated herein by reference.

BACKGROUND OF THE INVENTION

1. Field of the Invention

This invention relates generally to the transmission of digital data over optical fibers, and more particularly, to transmission based on quadrature amplitude modulation (QAM) and frequency division multiplexing.

2. Description of the Related Art

As the result of continuous advances in technology, particularly in the areas of networking including the Internet, telecommunications, and application areas which rely on networking or telecommunications, there is an increasing demand for capacity for the transmission of digital data. For example, the transmission of digital data over a network's trunk lines (such as the trunk lines for telephone companies or for the Internet), the transmission of images or video over the Internet, the distribution of software, the transfer of large amounts of data as might be required in transaction processing, or videoconferencing implemented over a public telephone network typically requires the high speed transmission of large amounts of digital data. Typical protocols which are intended to support such transmissions include the OC, STM, and STS protocols. As applications such as the ones mentioned above become more prevalent, the use of these and similar protocols and the corresponding demand for transmission capacity will only increase.

Optical fiber is a transmission medium which is well-suited for the high speed transmission of digital data. Optical fiber has an inherent bandwidth which is much greater than metal-based conductors, such as twisted pair or coaxial cable, and protocols such as the OC protocol have been developed for the transmission of digital data over optical fibers. However, increasing the data throughput of an optical fiber simply by increasing the clock speed of these protocols, such as moving from 155 million bits per second (Mbps) OC-3 to 625 Mbps OC-12, is not straightforward.

For example, existing optical fiber communication systems typically use simple modulation schemes which result in low bandwidth efficiencies of approximately 1 bit per sec per Herz (bps/Hz). As an example, the OC protocol is based on on-off keying (OOK), which is a bandwidth inefficient modulation scheme, and the transmission of OC signals across optical fiber results in a bandwidth efficiency of approximately 1 bps/Hz. The useable bandwidth of current optical fibers is limited in part by dispersion and non-linearities which increase with bandwidth. The low bandwidth efficiency means that, for a given digital data rate, the transmitted signal will occupy a larger bandwidth. This results in larger dispersion and non-linear effects, which limit the useful transmission range of the system.

In addition, even if the optical fiber supports the higher data rates, the corresponding electronics and electro-optics might not be able to. For example, moving from OC-3 to OC-12 quadruples the bit rate but also requires the associated electronics to operate approximately four times faster. Electronics at these speeds simply may not be available or, if available, may have significant other drawbacks, such as larger power consumption, unwieldy size, high cost, or unacceptable fragility.

In theory, the bandwidth efficiency problem could be addressed partly by the use of more bandwidth-efficient modulation schemes, such as quadrature amplitude modulation (QAM). These modulation schemes have been used previously in radio-wave and coaxial systems. However, optical fiber systems are based on an entirely different technology base and many of the technologies, techniques, and design tradeoffs which were developed in order to implement more advanced modulation schemes in radio-wave and coaxial systems would have only minimal application to optical fiber systems. In addition, optical fiber systems present their own difficulties, such as fiber dispersion and non-linearities causing unwanted interference. Even if bandwidth-efficient modulation schemes could be easily applied to optical fiber systems, their use does not fully address the high-speed electronics problem described above. For example, if OC data streams were QAM-modulated rather than OOK-modulated, a move from OC-3 to OC-12 would still require a four-fold increase in the speed of the corresponding electronics.

As a result, the application of sophisticated modulation schemes to optical fiber systems has been limited. For example, QAM has recently been applied to an optical fiber system for the transmission of compressed video for the cable TV industry. However, these communications systems run at low speeds with an aggregate data rate of less 1 billion bits per second (Gbps). Hence, they are not suited for high speed optical network operation.

Wavelength division multiplexing (WDM) is an alternate approach to increasing the data throughput of optical fiber systems. This approach, however, increases the aggregate bit rate simply by increasing the overall bandwidth utilized. It still suffers from bandwidth inefficiency. For example, a typical implementation of WDM might optically combine four OC-3 data streams, each at a different wavelength, to form an optical signal which has the same capacity as a single OC-12 data stream. The receiver would then optically separate the four OC-3 data streams, based on their wavelengths. In this approach, however, each OC-3 still has a bandwidth efficiency of approximately 1 bps/Hz, so the wavelength division multiplexed signal will also have a bandwidth efficiency of no more than 1 bps/Hz.

Thus, there is a need for systems and methods which transmit digital data over optical fibers at high aggregate data rates and with high bandwidth efficiencies, but without unnecessarily increasing the speed requirements on the corresponding electronics.

SUMMARY OF THE INVENTION

In accordance with the present invention, a system for transmitting digital data over an optical fiber includes a modulation stage, a frequency division multiplexer, and an optical modulator. The modulation stage receives a plurality of digital data channels and applies QAM modulation to produce a plurality of QAM-modulated signals. The frequency division multiplexer combines the QAM-modulated signals by frequency division multiplexing them into an RF signal. The RF signal is input to the optical modulator, which generates an optical signal modulated by the RF signal, for transmission over an optical fiber.

In a preferred embodiment, the modulation stage individually scrambles, forward error encodes and then QAM modulates, using 64 QAM modulation, each of 64 incoming OC-3 digital data channels to produce 64 QAM-modulated signals. The frequency division multiplexer combines the 64 resulting QAM-modulated signals in two steps, first frequency division multiplexing the QAM-modulated signals eight signals at a time to produce a total of eight signals at an intermediate frequency, and then frequency division multiplexing the eight intermediate signals to produce the RF signal. The optical modulator includes an optical source and an external modulator. The RF signal is applied to the external modulator to modulate the optical carrier produced by the optical source. The resulting optical signal is suitable for transmission across an optical fiber.

In accordance with another aspect of the invention a system for receiving digital data over an optical fiber includes a detector, a frequency division multiplexer, and a demodulation stage. The detector detects the optical signal produced by the transmitter system described previously, producing an RF signal. The frequency division demultiplexer separates the RF signal into its constituent QAM-modulated signals by frequency division demultiplexing. The demodulation stage converts the QAM-modulated signals into the original digital data channels.

The present invention is particularly advantageous because the combination of QAM modulation and frequency division multiplexing allows the transmission of digital data over optical fibers at high aggregate data rates and with high bandwidth efficiencies while using lower speed electronics. For example, the preferred embodiment described above has an aggregate data rate of approximately 10 Gbps and a bandwidth efficiency of approximately 4 bps/Hz, but the associated electronics need only support the 155 Mbps OC-3 data rate rather than the 10 Gbps aggregate rate.

BRIEF DESCRIPTION OF THE DRAWING

The invention has other advantages and features which will be more readily apparent from the following detailed description of the invention and the appended claims, when taken in conjunction with the accompanying drawing, in which:

DETAILED DESCRIPTION OF THE PREFERRED EMBODIMENTS

Figure 1:
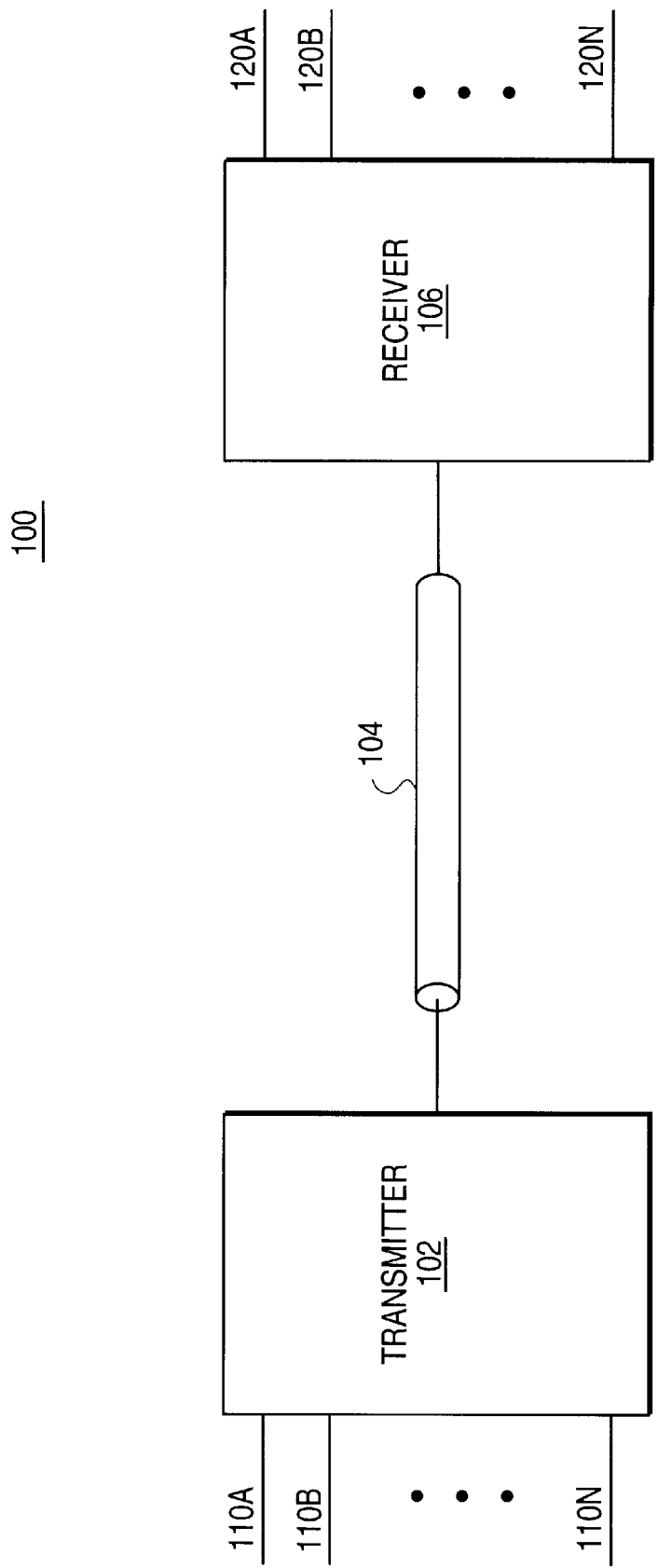
FIG. 1 is a diagram of a system 100 in accordance with the present invention.

FIG. 1 is a diagram of a system 100 in accordance with the present invention. The system 100 includes a transmitter 102, an optical fiber 104, and a receiver 106. The transmitter 102 is coupled to the receiver 106 by optical fiber 104.

The system 100 operates as follows. The transmitter 102 receives N digital data channels 110A–N (collectively, digital data channels 110) and combines them into a single optical signal for transmission over fiber 104. The transmitter 102 accomplishes this by using a combination of quadrature amplitude modulation (QAM) and frequency division multiplexing (FDM). The optical signal created by transmitter 102 is transmitted across fiber 104 to receiver 106. Receiver 106 then reverses the functionality of transmitter 102, converting the optical signal into N digital data channels 120A–N.

In a preferred embodiment which shall be referred to as the "N=64" or "K=64" embodiment, the digital data channels 110 include 64 STS-3 channels, each providing digital data at a rate of 155 million bits per second (Mbps) for an aggregate rate of approximately 10 billion bits per second (Gbps). In addition, the use of QAM modulation typically results in a bandwidth efficiency in the range of 2–5 bps/Hz, which is a significant increase over the typical 1 bps/Hz for conventional optical fiber systems; while the use of FDM allows the corresponding electronics to operate at 155 Mbps speeds, which is significantly lower than the 10 Gbps aggregate data rate. In alternate embodiments, the digital data channels 110 may be high speed channels which provide digital data at a predetermined, fixed rate, typically greater than 100 million bits per second (Mbps). For example, the digital data channels 110 may be OC-3 or STM-1 channels. Other protocols may also be supported, including, for example, higher data rate channels such as OC-12, OC-48, etc. The number N of digital data channels 110 may also vary. For example, in a variant of the N=64 embodiment, there are N=128 digital data channels 110 for an aggregate bit rate of approximately 20 Gbps. Digital data channels 110 which are in optical form, such as OC-3, may be converted to electrical form by an O/E converter stage coupled to the modulation stage 200.

Figure 2:
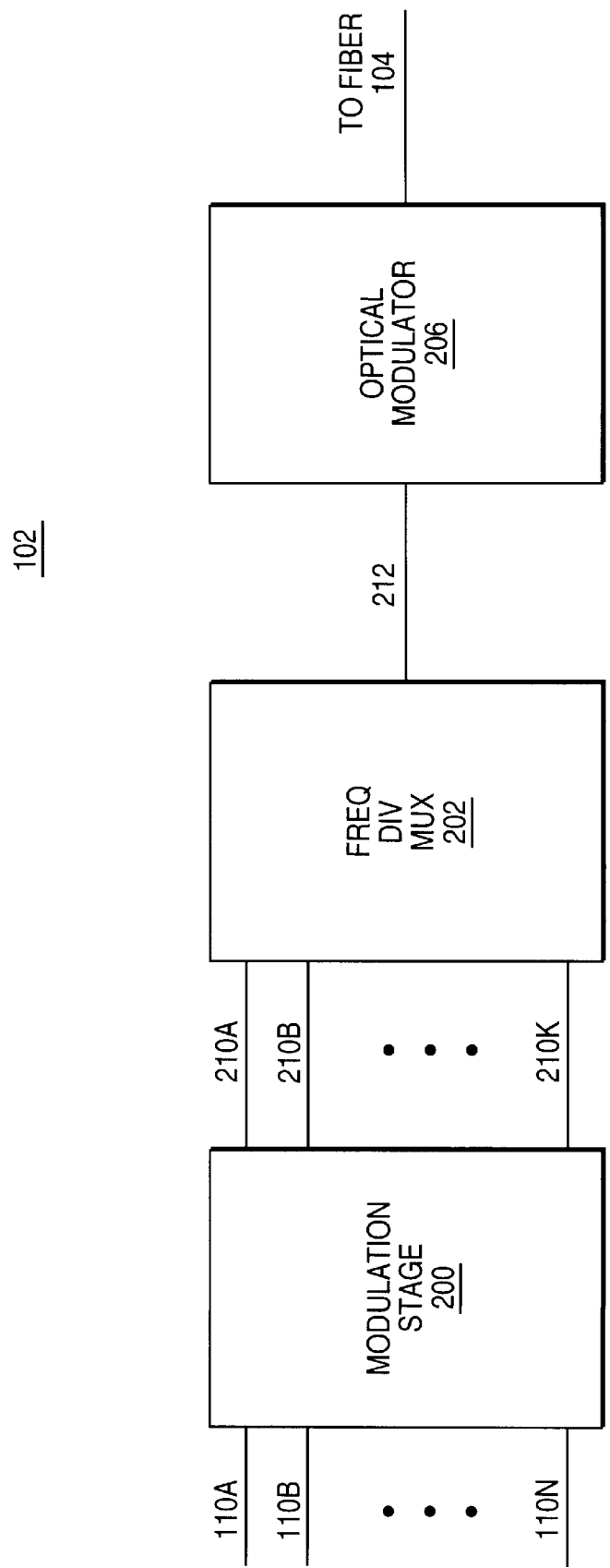
FIG. 2 is a block diagram of one embodiment of the transmitter 102 of FIG. 1.

FIG. 2 is a block diagram of one embodiment of the transmitter 102 of FIG. 1. The transmitter 102 includes a modulation stage 200, a frequency division multiplexer 202, and an optical modulator 204. These components form a data pipeline from the digital data channels 110 to the optical fiber 104. Specifically, the modulation stage 200 receives the digital data channels 110. The modulation stage 200 is coupled to the frequency division multiplexer 202, which is coupled to the optical modulator 204. The optical modulator 204 transmits the optical signal to optical fiber 104.

The transmitter 102 operates as follows. The modulation stage 200 receives the N digital data channels 110 and converts them into K QAM-modulated signals 210A–K. Frequency division multiplexer 202 receives the QAM-modulated signals 210 and frequency division multiplexes these signals into a single RF signal 212, which is then transmitted to the optical modulator 204. The optical modulator 204 produces an optical signal modulated by the RF signal and then transmits this resulting optical signal to optical fiber 104.

Various design tradeoffs are inherent in the design of a specific embodiment of transmitter 102 for use in a particular application. For example, in QAM, the signal lattice is evenly spaced in complex signal space but the total number of states in the QAM constellation is a design parameter which may be varied. The carrier frequencies for the QAM-modulated signals 210 are also design parameters which may be varied. The optimal choices of number of states, carrier frequencies, and other design parameters for modulation stage 200 will depend on the particular application. Some examples of modulation stage 200 will be described in further detail below. The frequency division multiplexer 202 also involves a number of design tradeoffs, such as the choices of intermediate frequencies, whether to implement components in the digital or in the analog domain, and whether to use multiple stages to achieve the multiplexing. As another example, an optical modulator 206 with better linearity will reduce unwanted harmonics and interference, thus increasing the transmission range of transmitter 102. However, optical modulators with better linearity are also more difficult to design and to produce. Hence, the optimal linearity will depend on the particular application. An example of a system-level tradeoff is the allocation of signal power and gain between the various components. Accordingly, many aspects of the invention will be described in the context of the N=64 embodiment introduced earlier. However, it is to be understood that the invention is not limited to this specific embodiment.

Figure 3:
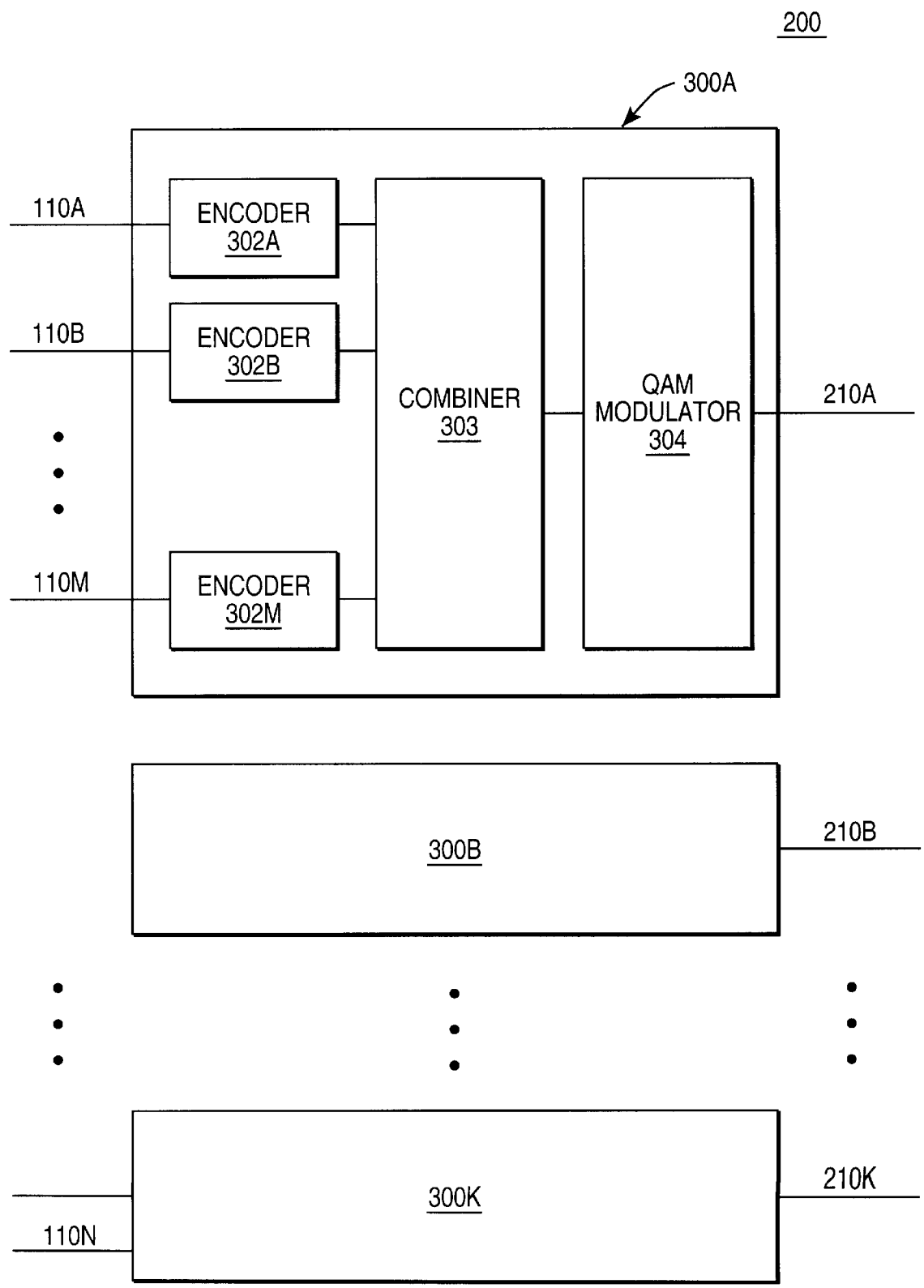
FIG. 3 is a block diagram of a preferred embodiment of the modulation stage 200 of FIG. 2.

FIG. 3 is a block diagram of a preferred embodiment of the modulation stage 200 of FIG. 2. The modulation stage 200 includes K modulation substages 300A–K. Each modulation substage 300 receives M of the digital data channels 110, where M=N/K, and converts them into a single QAM-modulated signal 210. In this embodiment, the modulation substages 300 are identical. For clarity, FIG. 3 shows a detail of a single modulation substage 300A.

Modulation substage 300A includes M encoders 302A–M, a combiner 303, and a QAM modulator 304. Each of the encoders 302 is coupled to receive one of the digital data channels 110. The QAM modulator 304 is coupled to the outputs of the encoders 302 via combiner 303.

The modulation substage 300A operates as follows. Each of the encoders 302 receives one of the digital data channels 110 and encodes the digital data. The encoded digital data channels from the encoders 302 are received by combiner 303, which combines the M data streams into a single input for QAM modulator 304. QAM modulator 304 converts the received data stream into the QAM-modulated signal 210. Various types of encoding and QAM modulation schemes are possible, one of which will be discussed in FIG. 4.

In a preferred embodiment, encoder 302 includes a forward error correction (FEC) encoder. This allows errors which occur during the subsequent processing stages and transmission to be corrected by the receiver. This is particularly relevant for optical fiber systems because they generally requires low bit error rates (BER) and any slight increase of the interference or noise level will cause the BER to exceed the threshold. FEC coding can compensate for these unwanted effects. Any variety of FEC techniques can be used, depending on the system margin requirements. For short transmission distances, FEC coding may not result in any significant advantages.

Figure 4:
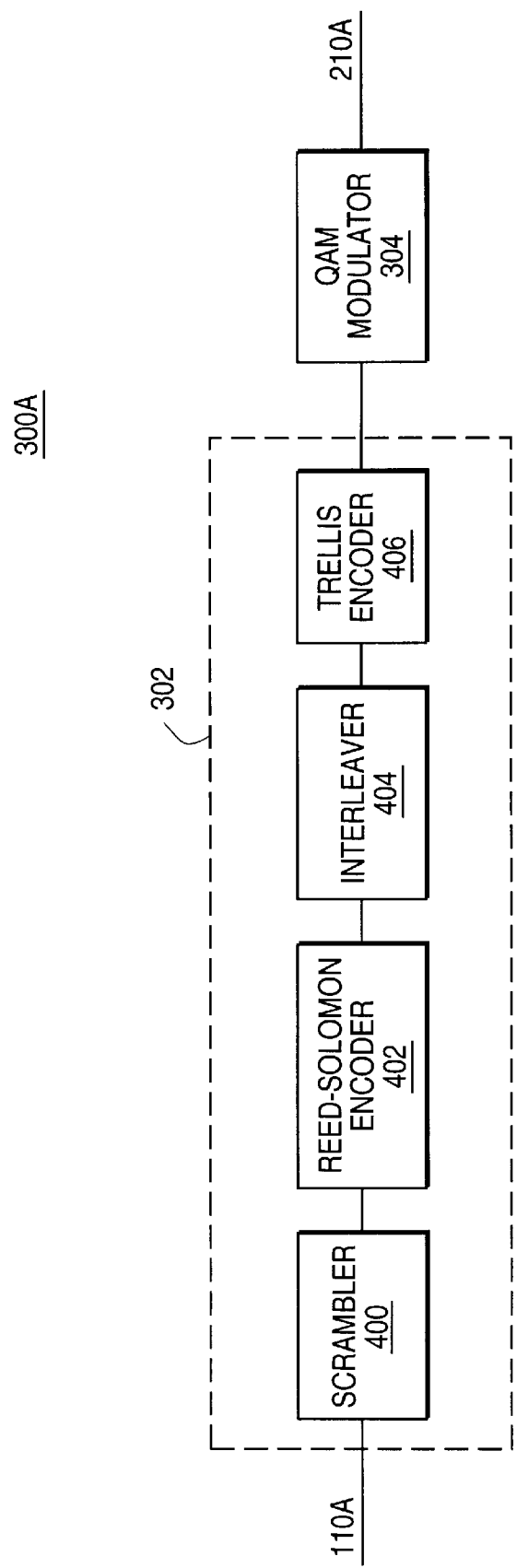
FIG. 4 is a block diagram of a preferred embodiment of the modulation substage 300A of FIG. 3.

FIG. 4 is a block diagram of the modulation substage 300A used in the N=64 embodiment. In this embodiment, K=N=64 and M=1. In other words, there is one modulation substage 300 for each incoming digital data channel 110 and each individual digital data channel 110 results in a separate QAM-modulated signal 210.

The modulation substage 300A includes a scrambler 400, a Reed-Solomon encoder 402, an interleaver 404, a trellis encoder 406, and QAM modulator 304. The scrambler 400, Reed-Solomon encoder 402, interleaver 404, and trellis encoder 406 are part of encoder 302. Combiner 303 of FIG. 3 is not required since M=1. These components are coupled to form a pipeline in which digital data flows from the scrambler 400 to the Reed-Solomon encoder 402 to the interleaver 404 to the trellis encoder 406 to QAM modulator 304, thus being converted from digital data channel 110 to QAM-modulated signal 210.

The modulation substage 300A operates as follows. The digital data channel 110 is received by scrambler 400 which scrambles the incoming digital data, thus randomizing the data string.

Reed-Solomon encoder 402 encodes the scrambled digital data channel according to a Reed-Solomon code. Programmable Reed-Solomon codes are preferred for maintaining very low BER (typ. $10^{-12}$) with low overhead (typ. less than 20%). For example, a Reed-Solomon code of (204,188) can be applied for an error correction capability of 8 error bits per every 188 data bits.

The interleaver 404 interleaves the digital data string output by the Reed-Solomon encoder 402. The interleaving results in more robust error recovery due to the nature of trellis encoder 406. Specifically, FEC codes are able to correct only a limited number of mistakes in a given block of data, but convolutional encoders such as trellis encoder 406 tend to cluster errors together. Hence, without interleaving, a block of data which contained a large cluster of errors would be difficult to recover. However, with interleaving, the cluster of errors is distributed over several blocks of data, each of which may be recovered by the FEC code. Convolution interleaving of depth 10 is preferred.

The trellis encoder 406 applies a QAM modulation, preferably 64 state QAM modulation, to the digital data stream output by the interleaver 404. The result typically is a complex baseband signal, representing the in-phase and quadrature (I and Q) components of the eventual QAM-modulated signal 210. The use of 64 QAM yields a modulation bandwidth efficiency of 6 bps/Hz, thus increasing the overall transmission capacity by a significant factor over conventional OOK systems. QAM with a different number of states may be used and varying the number of states from 16 to 1024 will generally improve the modulation bandwidth efficiency by a factor of 4 to 10.

QAM modulator 304 typically uses the I and Q components to modulate a carrier, resulting in QAM modulated signal 210 characterized by a carrier frequency. In a preferred embodiment, QAM modulator 304 implements the QAM modulation digitally and the sampled QAM modulated signals 210 are then converted to the analog domain by A/D converters for subsequent processing. In alternate embodiments, the QAM modulation may be implemented using analog techniques.

Figure 5:
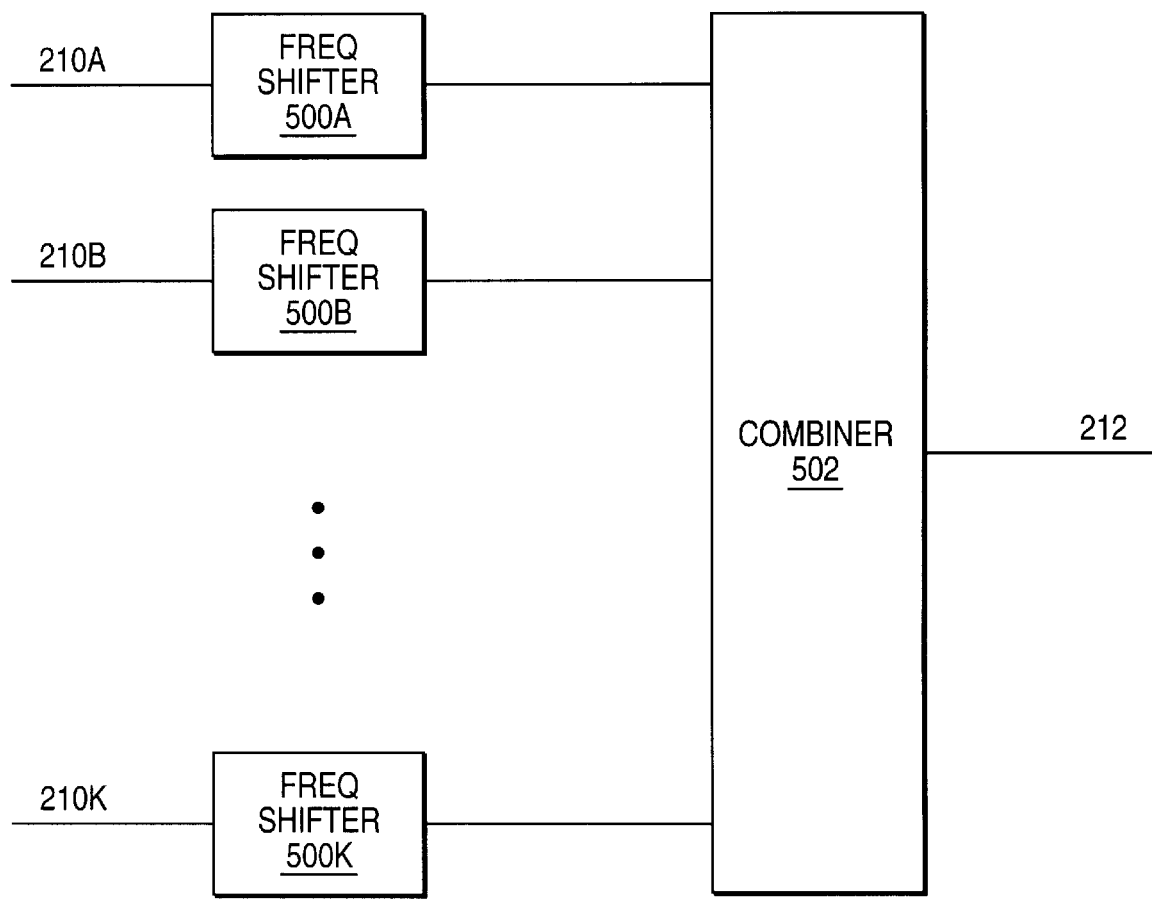
FIG. 5 is a block diagram of one embodiment of the frequency division multiplexer 202 of FIG. 2.

FIG. 5 is a block diagram of one embodiment of the frequency division multiplexer 202 of FIG. 2. The frequency division 202 includes K frequency shifters 500A–K and a combiner 502. Various devices may be used as frequency shifters 500, including both analog and digital designs. A common design is based on mixing the incoming signal with a local oscillator and then selecting the component at the desired frequency by means of a frequency filter. Each of the frequency shifters 500 is coupled to receive one of the QAM-modulated signals 210. The is combiner 502 is coupled to receive the outputs of the frequency shifters 500.

The frequency division multiplexer 202 operates as follows. Each frequency shifter 500 frequency shifts its incoming QAM-modulated signal 210 to a carrier frequency which is different from the carrier frequencies used by all the other frequency shifters 500. Hence, the output of the frequency shifters 500 is the QAM-modulated signals 210 but each at a different carrier frequency. The combiner 502 then combines these signals into the RF signal 212. In other words, each QAM-modulated signal 210 is a different tone in the RF signal 212.

In a variant of the frequency division multiplexer 202 of FIG. 5, the modulation stage 200 may produce QAM-modulated signals 210 at carrier frequencies which are suitable for direct combination into RF signal 212. In this case, the frequency division multiplexer 202 does not require the frequency shifters 500 and combiner 502 directly combines the QAM-modulated signals 210 into RF signal 212.

Figure 6A:
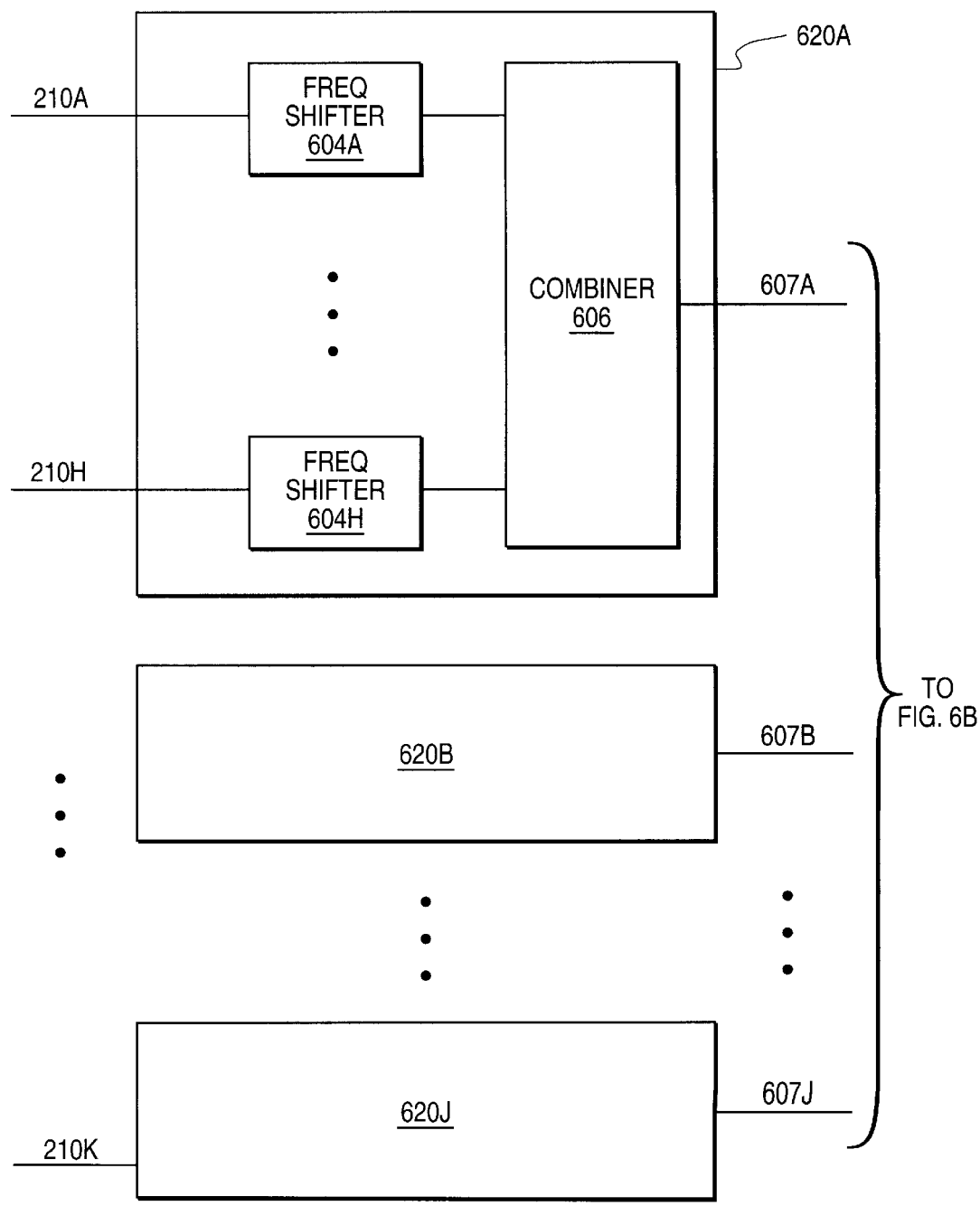
FIGS. 6A and 6B are block diagrams of a second embodiment of the frequency division multiplexer 202 of FIG. 2.
Figure 6B:
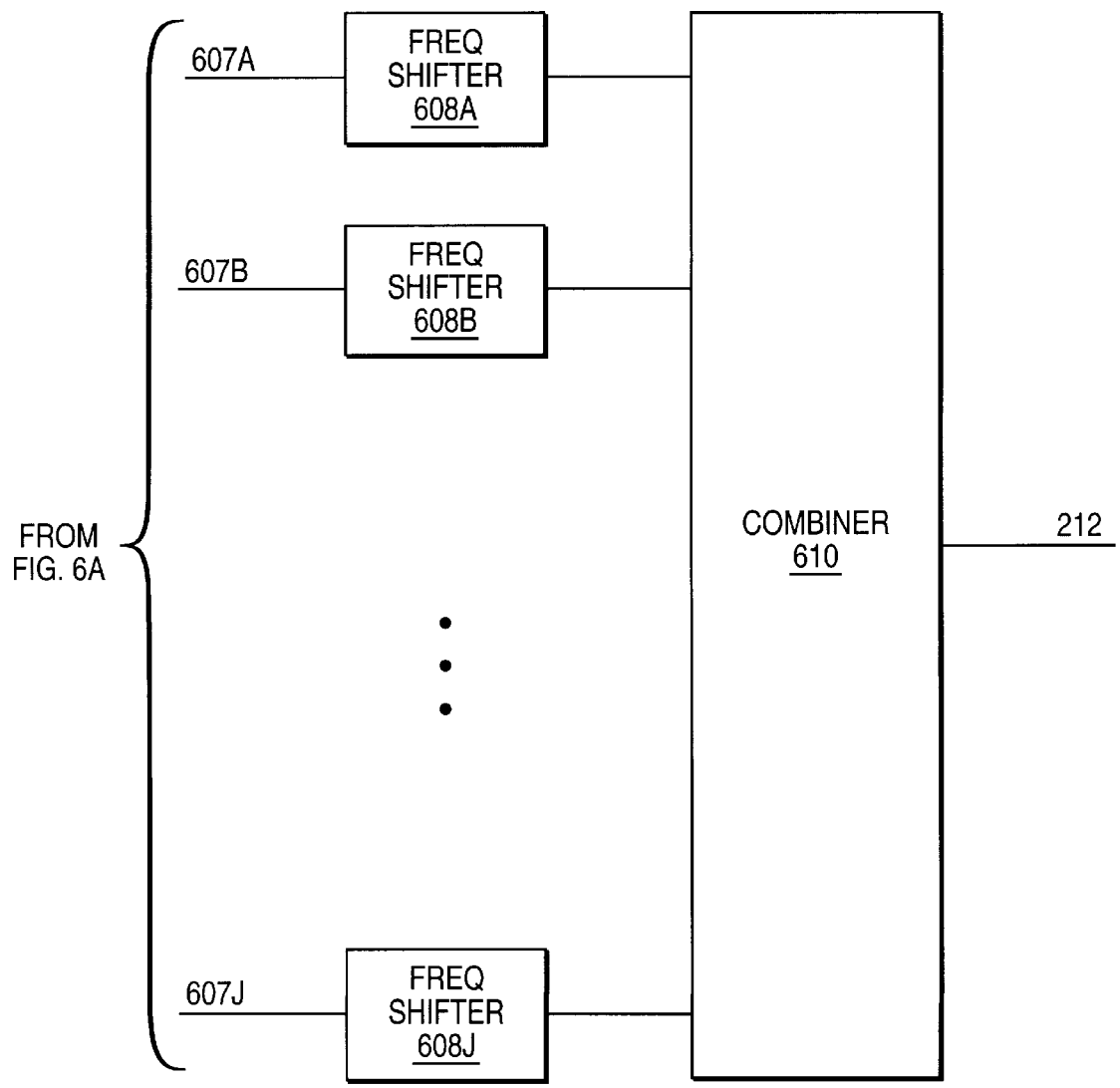

FIGS. 6A and 6B are block diagrams of a second embodiment of the frequency division multiplexer 202 of FIG. 2. In this approach, the frequency division multiplexing occurs in two stages: first stage 622 shown in FIG. 6A and second stage 624 shown in FIG. 6B. For convenience, the frequency division multiplexer 202 will be explained in reference to the K=64 embodiment.

In stage 622 of FIG. 6A, stage 622 is subdivided into the J substages 620A–J, with J=8 in this embodiment. The 64 QAM-modulated signals 210 are also subdivided into J groups of H signals each, with J=H=8 in this embodiment. Each substage 620 frequency division multiplexes one group of eight signals to form a single signal 607A–J, which is fed to the next stage 624. The processing of a single group of eight signals is shown in FIG. 6A. Other combinations of J and H may be used in alternate embodiments.

Substage 620A includes eight frequency shifters 604A–H, and a combiner 606. These components are coupled so that each incoming QAM-modulated signal 210 flows through a frequency shifter 604 to combiner 606.

Substage 620A operate as follows. In this embodiment, the QAM-modulated signals 210 are frequency shifted by frequency shifter 604 to a first carrier frequency. At this point, the first carrier frequencies for each of the eight signals within a substage 620 is different, but each substage 620 uses the same set of eight carrier frequencies. For example, in a preferred embodiment, the QAM-modulated signals 210 are frequency shifted to eight different carrier frequencies in the 1.0–1.6 GHz range. The combiner 606 combines the eight signals, all at different first carrier frequencies, into a single intermediate signal 607A which is input to stage 624 of FIG. 6B. Hence, at the output of stage 622 for the entire device, there are a total of eight intermediate signals 607, one for each substage 620. Furthermore, each intermediate signal 607 contains eight tones, one for each of the incoming QAM-modulated signal 210 within the substage 620.

Stage 624 of FIG. 6B then repeats the function of stage 622 to form the RF signal 212. Specifically, the stage 624 includes eight frequency shifters 608A–J and a combiner 610, which are coupled in the same fashion as the frequency shifters 604 and combiner 606 of stage 622. Each frequency shifter 608 receives one of the intermediate signals 607 from the previous stage 622 and frequency shifts it to a second carrier frequency. Each frequency shifter 608 uses a different second carrier frequency so that there is no overlap between the various signals. For example, continuing the previous example, the intermediate signals 607 were in the 1.0–1.6 GHz range. Frequency shifter 608A may shift the intermediate signal 607A to the 0.4–1.0 GHz range, frequency shifter 608B to the 1.0–1.6 GHz range; frequency shifter 608C to the 1.6–2.2 GHz range, and so forth. Note that, in this example, shifter 608A down-shifts, shifter 608B is not required since no shift is necessary, and the other shifters 608C–J up-shift. The combiner 610 then combines these outputs into the RF signal 212, which occupies the spectral band from 0.4–5.2 GHz in this example.

Referring again to FIG. 2, the optical modulator 204 receives the RF signal 212 and produces an optical beam modulated by the RF signal 212. Various techniques may be used to achieve this function. In a preferred embodiment, the modulator 204 includes an optical source and an external optical modulator. Examples of optical sources include solid state lasers and semiconductor lasers. Example external optical modulators include Mach Zehnder modulators, electro-optic modulators, and electro-absorptive modulators. The optical source produces an optical carrier, which is modulated by the RF signal 212 as the carrier passes through the external optical modulator. The RF signal may be predistorted in order to increase the linearity of the overall system.

Alternatively, the modulator 204 may be an internally modulated laser. In this case, the RF signal 212 drives the laser, the output of which will be an optical beam modulated by the RF signal.

Current optical fibers have two spectral regions which are commonly used for communications: the 1.3 and 1.55 micron regions. At a wavelength of 1.3 micron, transmission of the optical signal is primarily limited by attenuation in the fiber 104; dispersion is less of a factor. Conversely, at a wavelength of 1.55 micron, the optical signal will experience more dispersion but less attenuation. Hence, the optical signal preferably has a wavelength either in the 1.3 micron region or the 1.55 micron region and, for long distance communications systems, the 1.55 micron region is generally preferred.

Figure 7:
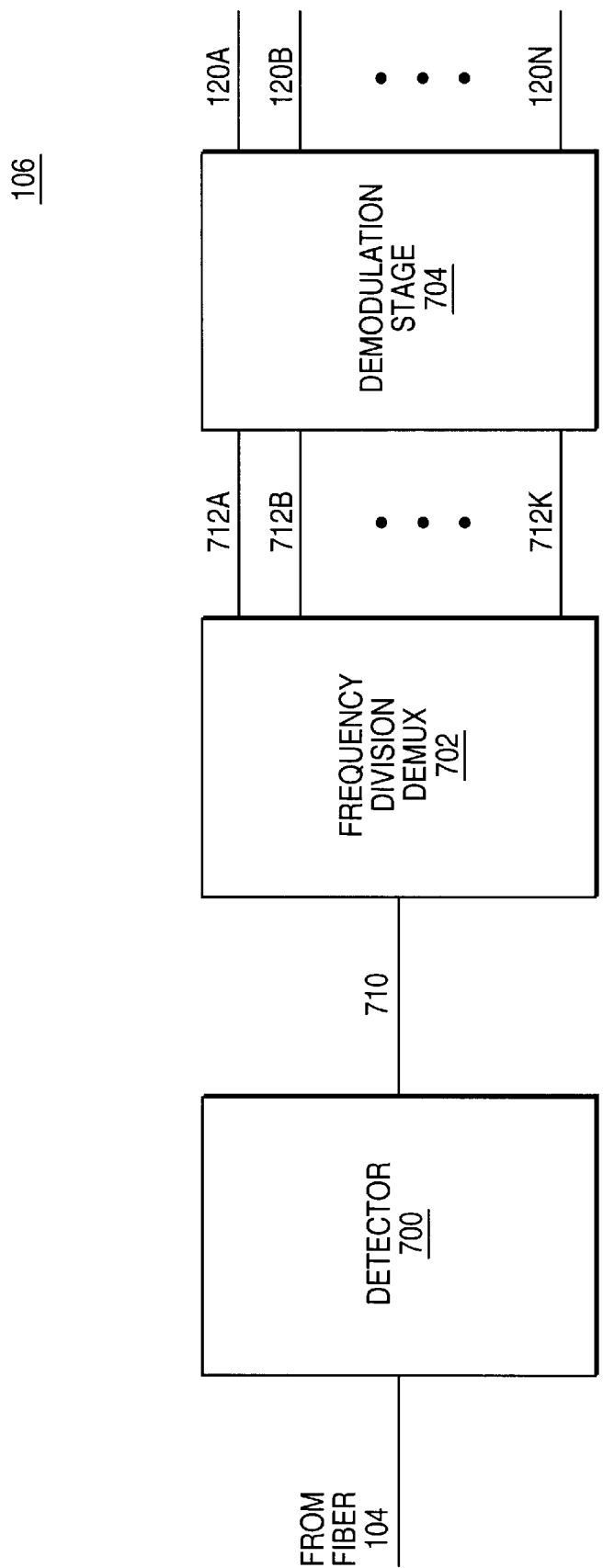
FIG. 7 is a block diagram of one embodiment of the receiver 106 of FIG. 1.

FIG. 7 is a block diagram of one embodiment of the receiver 106 of FIG. 1, which in large part, is the reverse of transmitter 102. The receiver 106 includes a detector 700 such as an avalanche photo-diode or PIN-diode, a frequency division demultiplexer 702, and a demodulation stage 704. These elements are coupled to form a data pipeline which transforms the optical signal from optical fiber 104 into the digital data channels 120. More specifically, the detector 700 is coupled to the optical fiber 104; the frequency division demultiplexer 702 is coupled to the detector 700; and the demodulation stage 704 is coupled to the frequency division demultiplexer 702. The demodulation stage 704 outputs the digital data channels 120.

The receiver 106 operates as follows. The detector 700 detects the optical signal transmitted over optical fiber 104 to produce an RF signal 710, which includes K QAM-modulated signals 712A–K, each characterized by a different carrier frequency. Frequency division demultiplexer 702 frequency division demultiplexes the RF signal 710 into the K QAM-modulated signals 712. Demodulation stage 704 then converts the QAM-modulated signals 712 into the N digital data channels 120. This is essentially the reverse of transmitter 102, as shown in FIG. 2. RF signal 710, QAM-modulated signals 712, and digital data channels 120 are the counterparts to RF signal 212, QAM-modulated signals 210, and digital data channels 110.

Figure 8:
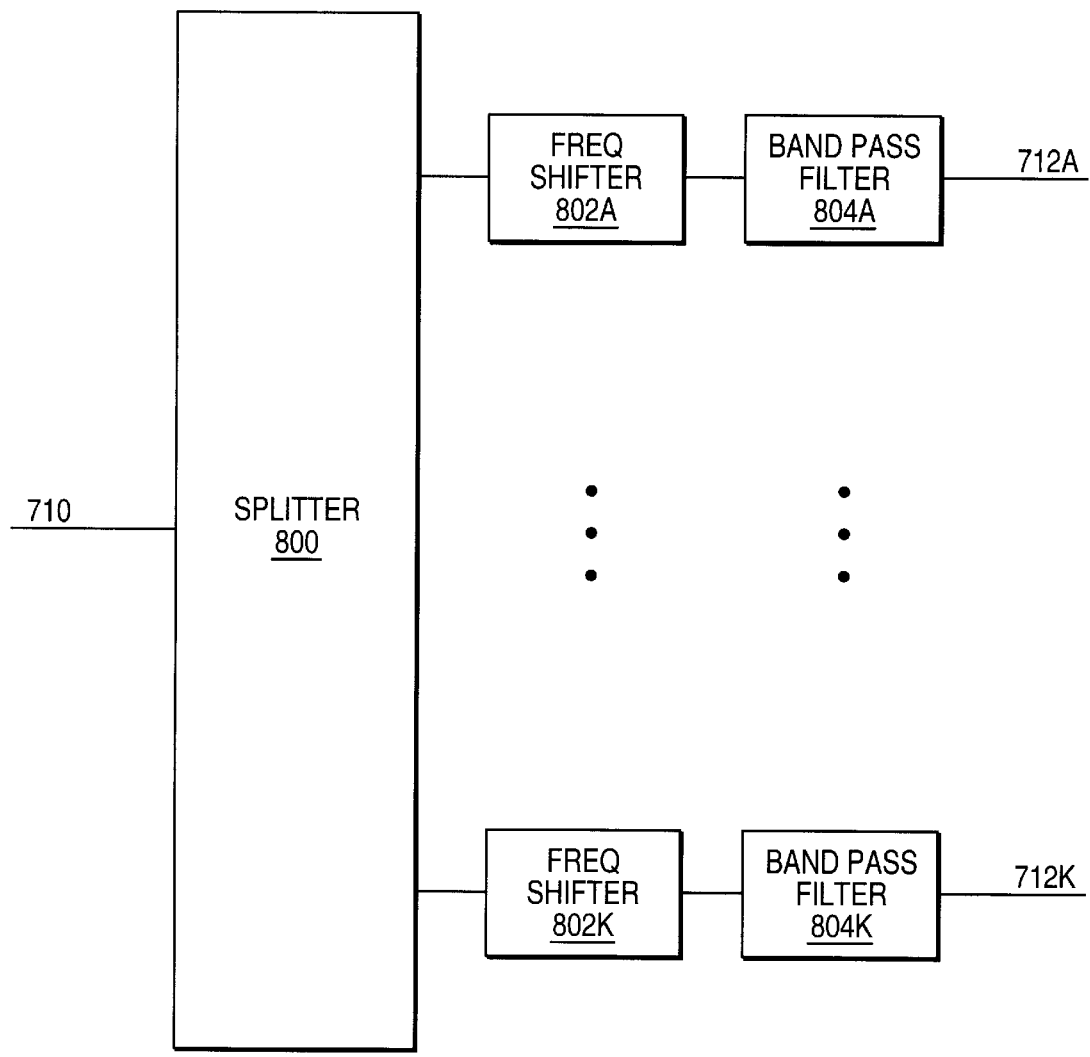
FIG. 8 is a block diagram of one embodiment of the frequency division demultiplexer 702 of FIG. 7.

FIG. 8 is a block diagram of one embodiment of the frequency division multiplexer 702 of FIG. 7. This embodiment includes a splitter 800, K frequency shifters 802A–K, and K bandpass filters 804A–K. The splitter 800 is coupled to receive the RF signal 710 and each frequency shifter 802 is coupled to receive an output of splitter 800. The output of each frequency shifter 802 is coupled to an input of a bandpass filter 804.

The frequency division multiplexer 702 operates as follows. The splitter 800 splits the RF signal 710 into K signals, each of which is input into a frequency shifter 802-bandpass filter 804 combination. For example, one of the split RF signals is input into frequency shifter 802A. As described previously, the RF signal includes K different QAM-modulated signals each at a different carrier frequency. The frequency shifter 802A shifts the incoming RF signal by an amount such that one of these QAM-modulated signals is shifted to the pass band of filter 804A. This signal is filtered from the other signals by bandpass filter 804A, thus producing QAM-modulated signal 712A. Each of the frequency shifters 802 shifts by a different frequency amount so that each bandpass filter 804 will select a different one of the K QAM-modulated signals contained in the RF signal 710. In a preferred embodiment, the pass bands of the filters 804A–K are the same so that QAM-modulated signals 712 are characterized by the same carrier frequency.

Figure 9A:
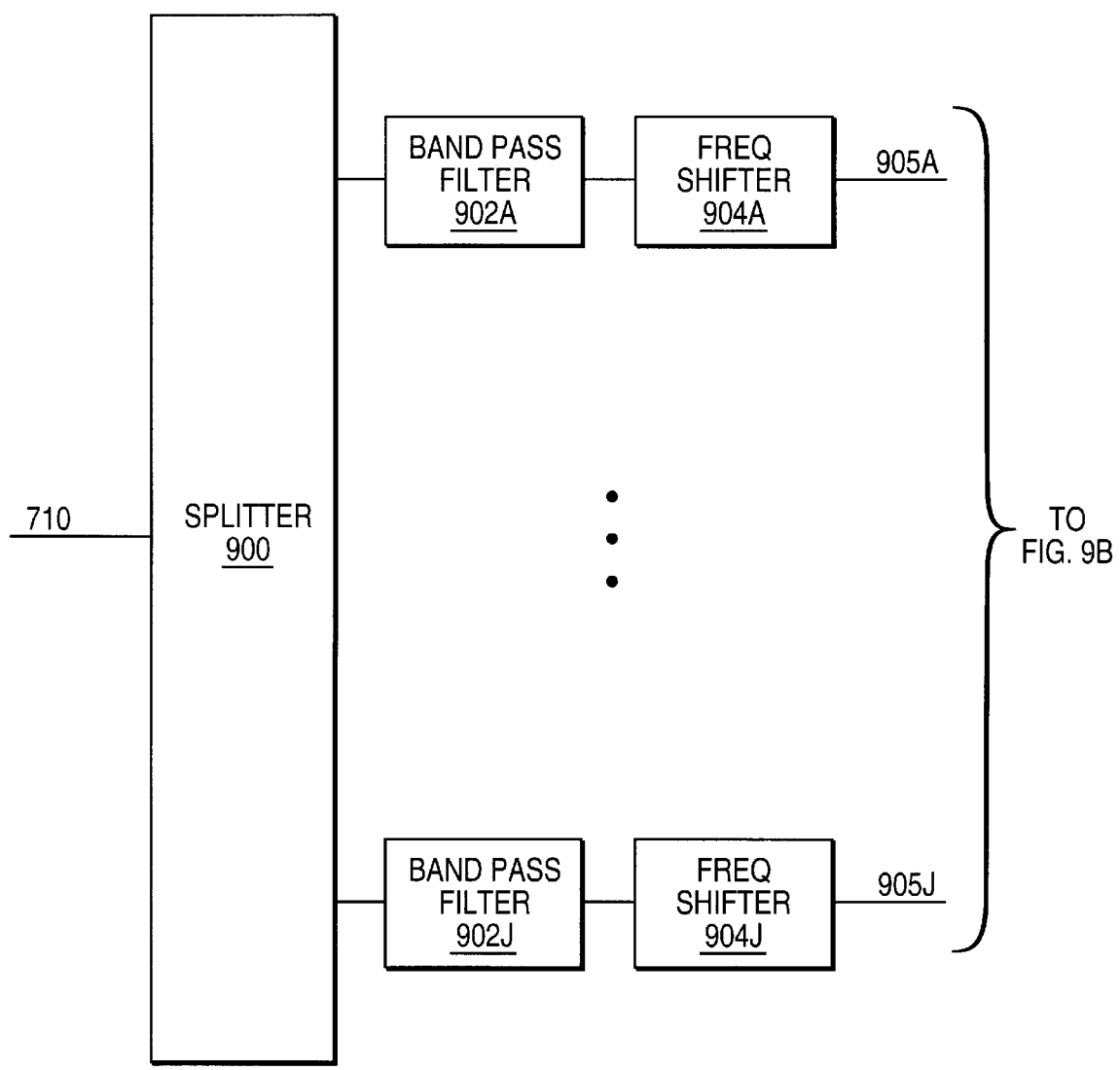
FIGS. 9A and 9B are block diagrams of a second embodiment of the frequency division demultiplexer 702 of FIG. 7.
Figure 9B:
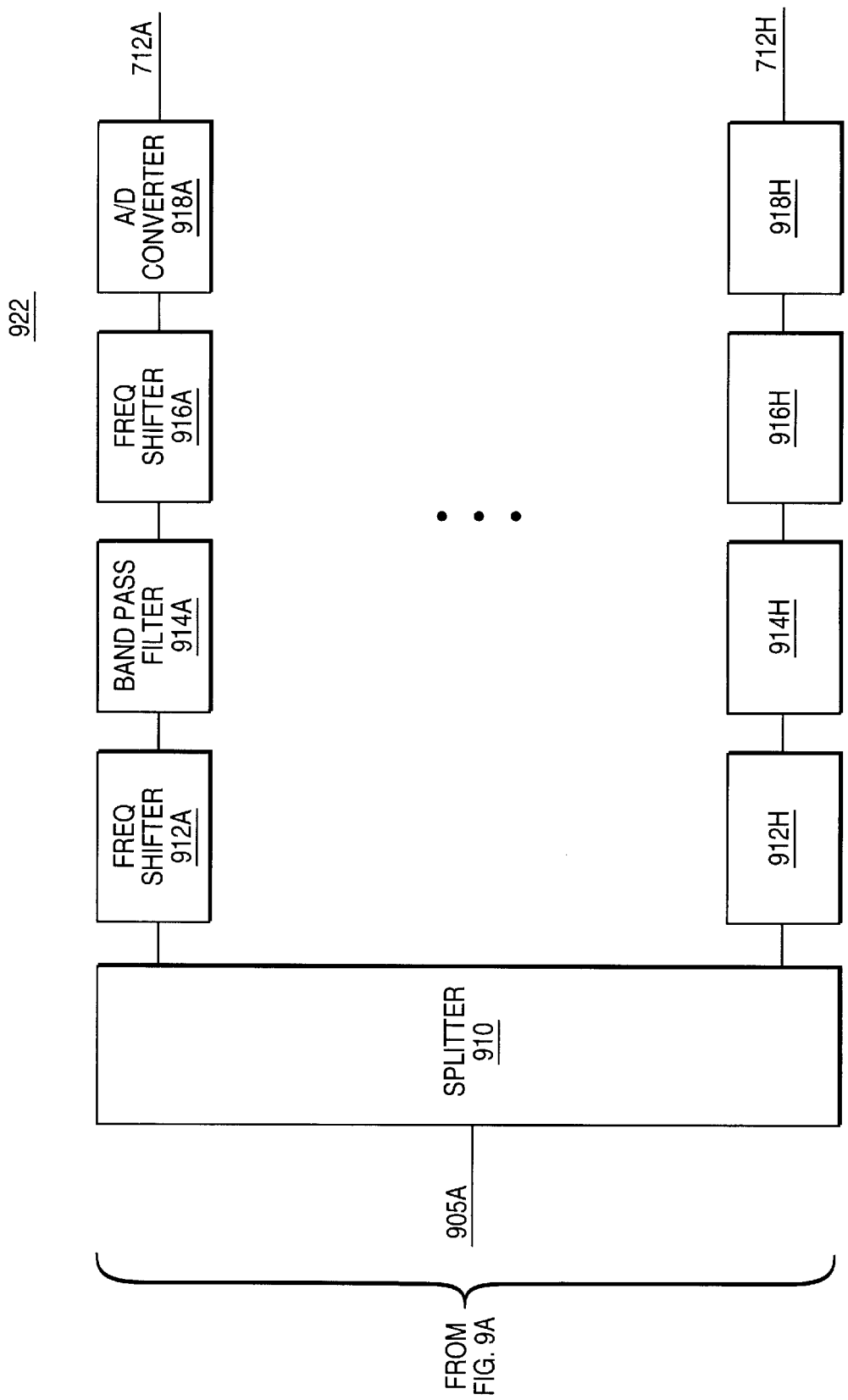

FIGS. 9A and 9B are block diagrams of a second embodiment of the frequency division multiplexer 702 of FIG. 7. This embodiment achieves the frequency division demultiplexing in multiple stages. FIG. 9A shows a first stage 920; while FIG. 9B shows second stages 922. The multi-stage frequency division demultiplexer 702 will be explained in the context of the K=64 embodiment.

In this embodiment, the first stage 920 of FIG. 9A includes a splitter 900, eight bandpass filters 902A–J and eight frequency shifters 904A–J. The splitter 900 splits the incoming RF signal 710 into eight signals, each of which is fed to a bandpass filter 902-frequency shifter 904 combination. As discussed in connection with FIGS. 6A and 6B, the RF signal in this particular embodiment contains eight groups of eight signals each. The purpose of stage 920 is to frequency division demultiplex the RF signal 710 into the eight groups.

Stage 920 operates as follows. Each of the bandpass filters 902 has a different pass band and therefore selects a different one of the eight groups contained in RF signal 710. Continuing the example of FIGS. 6A and 6B, the various pass bands would be 0.4–1.0 GHz, 1.0–1.6 GHz, etc. The frequency shifters 904 then frequency shift each of these groups to the same carrier frequency, the 1.0–1.6 GHz band in this example. Since each group was originally characterized by a different carrier frequency, each of the frequency shifters 904 must frequency shift by a different amount. The output of stage 920 is eight signals 905A–J, each at the same carrier frequency and each containing one group of eight QAM-modulated signals. Each of these signals is then input into stage 922 of FIG. 9B.

For convenience, FIG. 9B only shows the processing of signal 905A of the eight signals 905 from stage 920. Stage 922 of FIG. 9B includes a splitter 910, eight frequency shifters 912A–H, eight bandpass filters 914A–H, eight frequency shifters 916A–H, and eight A/D converters 918A–H. The incoming signal 905A contains eight QAM-modulated signals, each at a different frequency. The splitter 910 splits the incoming signal into eight different signals, each of which will be converted to a digital QAM-modulated signal 712A–H.

This is accomplished as follows. Each of the frequency shifters 912 frequency shifts one of the QAM-modulated signals in the incoming signal to a common carrier frequency. Bandpass filters 914 filter out the signal at the common carrier frequency. As with FIG. 9A, since each of the incoming signals is characterized by a different carrier frequency, each of the frequency shifters 912 must frequency shift by a different amount in order to shift the desired QAM-modulated signal to the proper bandpass region. Frequency shifter 916 then shifts these signals to a lower common carrier frequency. This is advantageous because bandpass filter 914 may operate at a higher frequency, permitting the use of filters with better performance. A/D converters 918 sample the output of frequency shifters 916, converting the QAM-modulated signals from analog to digital form in preparation for digital QAM demodulation.

Figure 10:
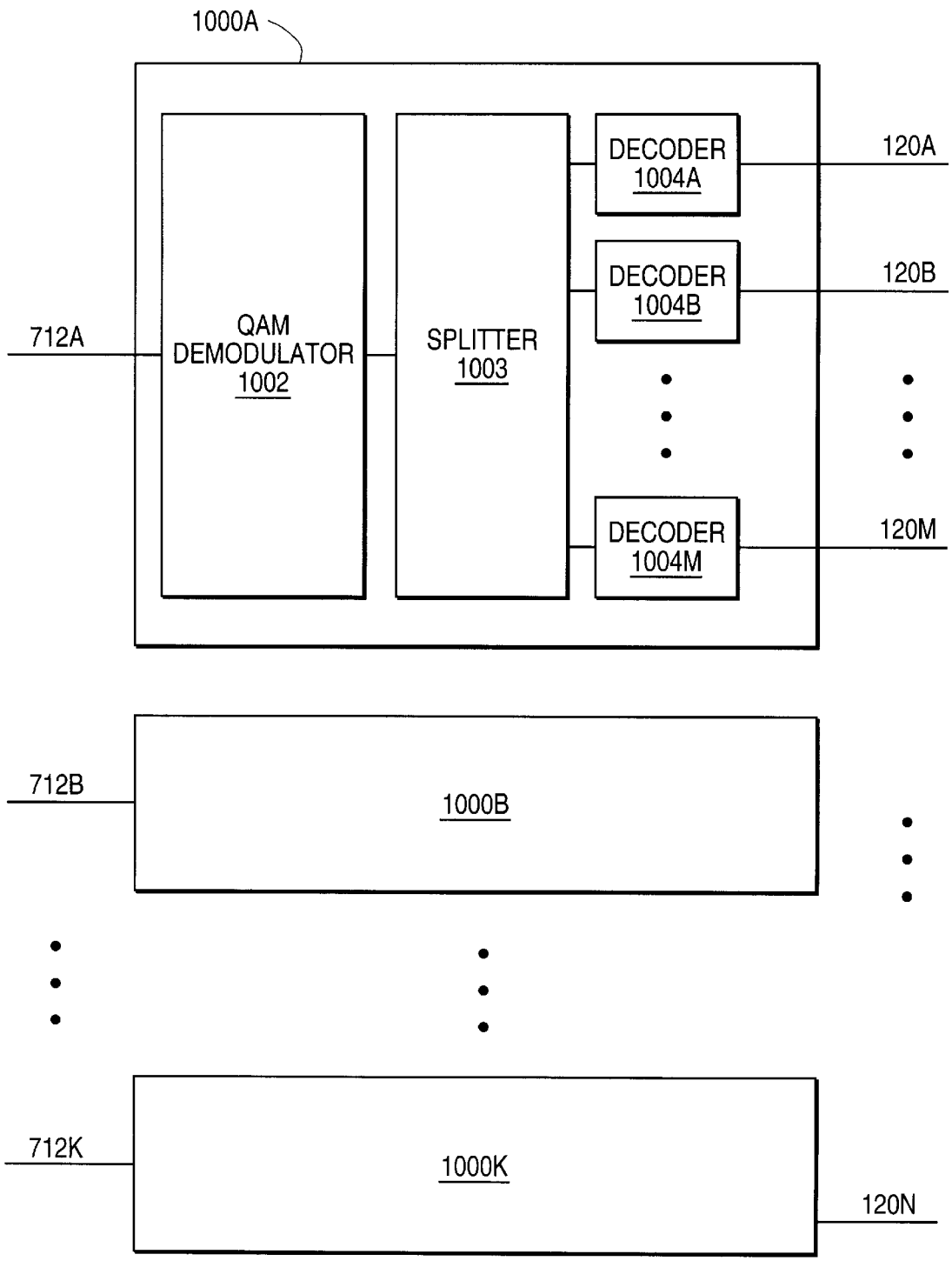
FIG. 10 is a block diagram of a preferred embodiment of the demodulation stage 704 of FIG. 7.

FIG. 10 is a block diagram of a preferred embodiment of the demodulation stage 704 of FIG. 7. The demodulation stage 704 includes K demodulation substages 1000A–K. FIG. 10 shows the details of one of these demodulation substages 1000A. Each demodulation substage 1000 converts one of the QAM-modulated signals 712 into M digital data channels 120A–M, where M=N/K. The demodulation substage 1000A includes a QAM demodulator 1002 coupled to M decoders 1004A–M by splitter 1003. The demodulation substage 1000A generally performs the reverse function of the modulation substage 300A. Specifically, the QAM demodulator 1002 removes the QAM modulation from the incoming QAM-modulated signal 712. Splitter 1003 separates the demodulated signals into its constituent M data streams, which are then decoded by decoders 1004 to form the digital data channels 120.

Figure 11:
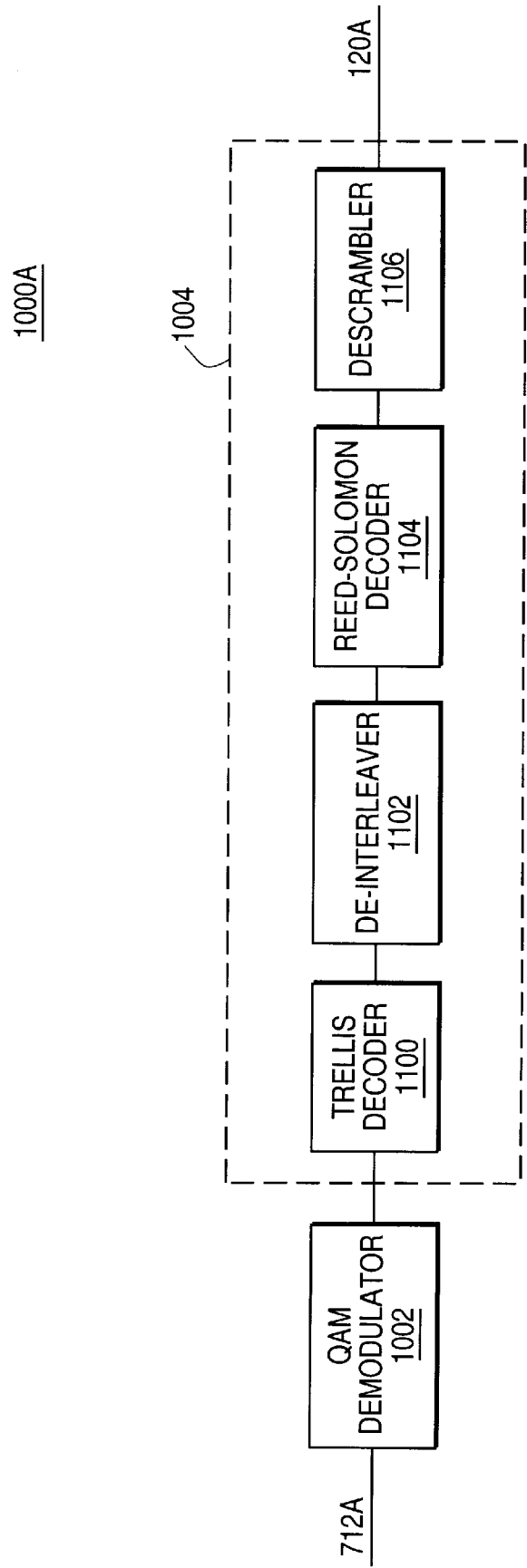
FIG. 11 is a block diagram of a preferred embodiment of the demodulation substage 1000A of FIG. 10.

FIG. 11 is a block diagram of the demodulation substage 1000A of FIG. 10 used in the N=64 embodiment. In this case, M=1 so splitter 1003 is not required. Decoder 1004 includes trellis decoder 1100, de-interleaver 1102, Reed-Solomon decoder 1104 and descrambler 1106. These components are coupled in the reverse order of their counterparts shown in FIG. 4. Specifically, following the direction of data flow, the QAM demodulator 1002 is coupled to the trellis decoder 1100 to the de-interleaver 1102 to the Reed-Solomon decoder 1104 to the descrambler 1106.

The demodulation substage 1000A operates as FIG. 11 would suggest. The QAM demodulator 1002 demodulates the incoming QAM-modulated signal 712A, typically extracting baseband I and Q signals from the modulated carrier. Trellis decoder 1100 converts the I and Q signals to a digital stream. De-interleaver 1102 reverses the interleaving process. Reed-Solomon decoder 1104 reverses the Reed-Solomon encoding, correcting any errors which have occurred. Descrambler 1106 descrambles the resulting decoded signal to produce the digital data channels 120. The resulting digital data channels may be converted from electrical to optical form by a subsequent E/O conversion stage.

Although the invention has been described in considerable detail with reference to certain preferred embodiments thereof, other embodiments are possible. Therefore, the scope of the appended claims should not be limited to the description of the preferred embodiments contained herein.

What is claimed is:

1. A system for receiving digital data over a telecommunications network including an optical fiber, the system comprising:

a detector for detecting an optical signal transmitted over the telecommunications network via the optical fiber to produce an RF signal;

a frequency division demultiplexer coupled to the detector for frequency division demultiplexing the RF signal into a plurality K of QAM-modulated signals; and a plurality K of demodulation substages, each demodulation substage for converting one of the plurality K of QAM-modulated signals into one of a plurality K of digital data channels, each demodulation substage comprising:

a QAM demodulator for converting the QAM-modulated signal into a demodulated signal, a trellis decoder coupled to the QAM demodulator for decoding the demodulated signal according to a QAM constellation, a de-interleaver coupled to the trellis decoder for de-interleaving the decoded signal, a Reed-Solomon decoder coupled to the de-interleaver for decoding the de-interleaved signal according to a Reed-Solomon code; and a descrambler coupled to the Reed-Solomon decoder for descrambling the decoded signal.

2. A method for receiving digital data over a telecommunications network including an optical fiber, the method comprising:

detecting an optical signal transmitted over the telecommunications network via the optical fiber to produce an RF signal;

frequency division demultiplexing the RF signal into a plurality K of QAM-modulated signals; and for K times in parallel, covering one of the plurality K of QAM-modulated signals into one of a plurality K of digital data channels, wherein converting one of the plurality K of QAM-modulated signals into one of the plurality K of digital data channels comprises:

converting the QAM-modulated signal into a demodulated signal, decoding the demodulated signal according to a QAM constellation de-interleaving the decoded signal decoding the de-interleaved signal according to a Reed-Solomon code and descrambling the decoded signal.

* * * * *

UNITED STATES PATENT AND TRADEMARK OFFICE
CERTIFICATE OF CORRECTION

PATENT NO. : 6,407,843 B1
DATED : June 18, 2002
INVENTOR(S) : Michael W. Rowan, Roger R. Taur, Peter Chang, James F. Coward, Stuart Wilson and Ting K. Yee It is certified that error appears in the above-identified patent and that said Letters Patent is hereby corrected as shown below:

Column 12,
Line 4, please replace "covering" with -- converting --.
Line 13, please add a comma after "constellation".
Line 14, please add a comma after "signal".
Line 16, please add a semicolon after "code".

Signed and Sealed this

Sixth Day of August, 2002

*Attest:*

*Attesting Officer*

JAMES E. ROGAN
*Director of the United States Patent and Trademark Office*